(12) United States Patent
Han et al.

(10) Patent No.: US 9,635,432 B2
(45) Date of Patent: Apr. 25, 2017

(54) METHOD FOR SETTING FUNCTION AND DISPLAY APPARATUS APPLYING THE SAME

(75) Inventors: Ji-youn Han, Suwon-si (KR); Chang-seog Ko, Hwaseong-si (KR); Won-il Kim, Gwacheon-si (KR); Kyeong-a Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 13/225,018

(22) Filed: Sep. 2, 2011

(65) Prior Publication Data

US 2012/0060115 A1    Mar. 8, 2012

(30) Foreign Application Priority Data

Sep. 3, 2010 (KR) .................. 10-2010-0086547

(51) Int. Cl.
*H04N 21/485*    (2011.01)
*G06F 3/0481*    (2013.01)

(52) U.S. Cl.
CPC ....... *H04N 21/4852* (2013.01); *H04N 21/485* (2013.01); *H04N 21/4854* (2013.01); *G06F 3/0481* (2013.01)

(58) Field of Classification Search
CPC ......... G06F 2206/1008; G06F 3/04847; G01C 15/00; H04N 5/44543; H04N 21/4853; H04N 21/485; H04N 21/4854
USPC ........................................ 715/808, 819, 841
See application file for complete search history.

(56) References Cited

U.S. PATENT DOCUMENTS

| 6,002,398 | A  | * | 12/1999 | Wilson .................. 715/808 |
| 6,266,098 | B1 |   | 7/2001  | Cove et al. |
| 6,734,883 | B1 | * | 5/2004  | Wynn et al. ........... 715/808 |
| 6,976,228 | B2 | * | 12/2005 | Bernhardson ...... G06F 3/0482 715/786 |
| 2004/0227779 | A1 | * | 11/2004 | Weber ............... H04L 12/2805 715/733 |
| 2005/0185095 | A1 | * | 8/2005 | Hsieh .................. 348/569 |
| 2007/0136681 | A1 | * | 6/2007 | Miller ................. 715/782 |
| 2007/0211168 | A1 | * | 9/2007 | Ko et al. ............. 348/462 |
| 2007/0229465 | A1 | * | 10/2007 | Sakai ................. G08C 17/00 345/173 |
| 2008/0178214 | A1 |   | 7/2008 | Shivaji-Rao |

(Continued)

FOREIGN PATENT DOCUMENTS

| EP | 2194708 A2 | 6/2010 |
| JP | 2001-257964 A | 9/2001 |
| KR | 10-2006-0026266 A | 3/2006 |

OTHER PUBLICATIONS

Communication, dated Dec. 7, 2011, issued by the European Patent Office in corresponding European Application No. 11179920.1.

(Continued)

*Primary Examiner* — Stella E. Higgs
(74) *Attorney, Agent, or Firm* — Sughrue Mion, PLLC

(57) ABSTRACT

A method of setting a function and a display apparatus applying the same are provided. The method of setting a function of the display apparatus includes displaying a set item list, which includes one or more set items, on a screen of the display apparatus; and in response to a set item on the set item list being selected, providing a menu for accessing one or more other set items associated with the selected set item.

14 Claims, 12 Drawing Sheets

(56) References Cited

U.S. PATENT DOCUMENTS

2010/0053466 A1* 3/2010 Naka et al. .................. 348/734
2010/0281374 A1* 11/2010 Schulz et al. ................ 715/723
2010/0306703 A1* 12/2010 Bourganel ............ G06F 3/0482
            715/823

OTHER PUBLICATIONS

Communication dated Jul. 28, 2016, issued by the European Patent Office in counterpart European Application No. 11179920.1.
Communication dated Apr. 25, 2016 issued by the European Patent Office in counterpart Application No. 11 179 920.1.
Communication dated Nov. 17, 2016 issued by the Korean Intellectual Property Office in Korean Patent Application No. 10-2010-0086547.

* cited by examiner

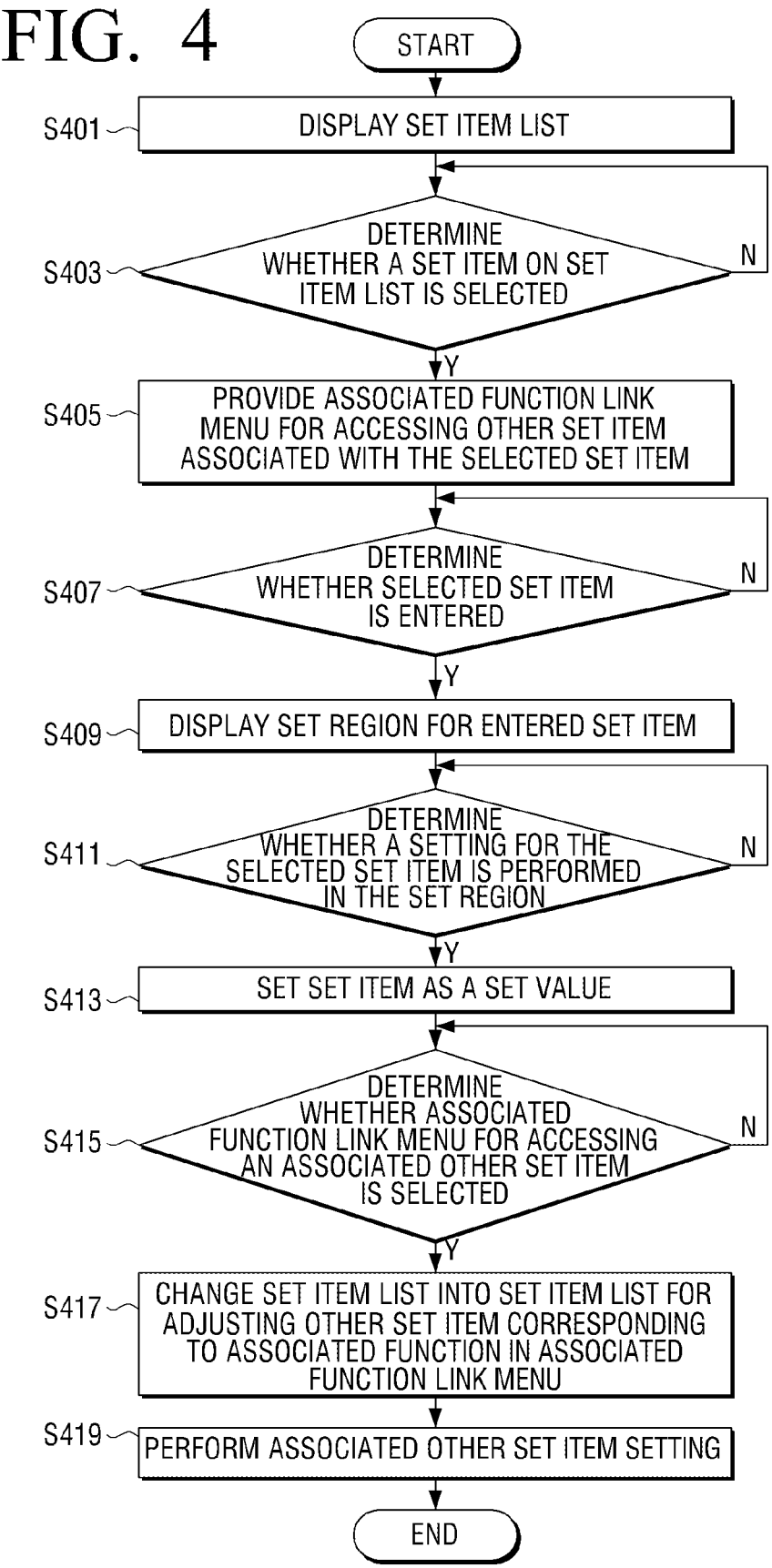

METHOD FOR SETTING FUNCTION AND DISPLAY APPARATUS APPLYING THE SAME

CROSS-REFERENCE TO RELATED APPLICATION

This application claims priority from Korean Patent Application No. 10-2010-0086547, filed on Sep. 3, 2010, in the Korean Intellectual Property Office, the disclosure of which is incorporated by reference herein in its entirety.

BACKGROUND

1. Field

Methods and apparatuses consistent with exemplary embodiments relate to setting a function of a display apparatus, and more particularly, to a method of setting a function of a display device via a configuration setting screen and the display device applying the same.

2. Description of the Related Art

As related art display apparatuses have been developed technically, the related art display apparatuses have come to have many different functions. However, this has resulted in a disadvantage in that a user must manipulate many different screens in order to set various functions of the display apparatus.

Moreover, as functions have been added, diverse functions are provided for the display apparatuses, some of which are associated with one another. For example, functions for performing similar functions and functions affecting other functions occasionally exist.

However, there is another disadvantage in that, if a user changes one function that has an associated function, the user must then find and set or execute the associated function. This often requires that multiple menus be opened and closed in order to find and set or execute the function and associated function, for example, when the function and associated function are present in different menus of the display apparatus. In addition, in the case in which the user is unaware of overall structure of the menu system of the display apparatus, it becomes difficult to search a position of the associated function which causes trouble for the user in searching and setting a desired function.

SUMMARY

One or more exemplary embodiments may overcome the above disadvantages and other disadvantages not described above. However, it is to be understood that one or more exemplary embodiment are not required to overcome the disadvantages described above, and may not overcome any of the disadvantages described above.

One or more exemplary embodiment provide a method of setting a function, which displays a set item list on a screen and if one set item is selected on the set item list, provides a menu accessing at least one other set item associated with the selected set item, and a display apparatus applying the same.

According to an aspect of an exemplary embodiment, there is provided a method of setting a function of a display device. The method may include displaying a set item list, which includes at least one set item, on a screen of the display apparatus; and if a set item on the set item list is selected, providing a menu for accessing at least one other set item associated with the selected set item.

The method may further include, if the selected set item on the set item list is entered, displaying a set region for the selected set item, the set region comprising at least one setting for the selected set item; and if a setting in the set region is selected and entered, setting a set value of the selected set item to the selected and entered setting.

Alternatively, the method may further include, if the selected set item on the set item list is entered, displaying a set region for the selected set item as a pop-up window that overlaps at least partially with the set item list, the set region comprising at least one setting for the selected set item; and if a setting in the set region is selected and entered, setting a set value of the selected set item to the selected and entered setting.

The at least one other set item may be a set item which is to be manually set in association with the selected set item.

Alternatively, the at least one other set item may be a set item which is to be automatically set in association with the setting of the selected set item.

The at least one other set item may include a set item which is the same as the selected set item in at least one of an item type, an item name, a characteristic, a setting method, a setting effect and a setting target of the selected set item.

In addition, the method may further include, if an other set item in the menu is selected, displaying a pop-up window including a description of the other set item around the menu.

The method may further include, if an other set item in the menu is selected, changing the set item list to a set item list for adjusting the selected other set item.

The set items may be associated with the at least one other set item during manufacturing of the display apparatus.

According to an aspect of another exemplary embodiment, there is provided a display apparatus. The display apparatus may include a display unit; and a controller which controls the display unit to display a set item list, which includes at least one set item and, if a set item on the set item list is selected, to provide a menu for accessing at least one other set item associated with the selected set item.

If the selected set item on the set item list is entered, the controller may display a set region for the selected set item, the set region comprising at least one setting for the selected set item; and if a setting in the set region is selected and entered, the controller may set a set value of the selected set item to the selected and entered setting.

Alternatively, if the selected set item on the set item list is entered, the controller may display a set region for the selected set item as a pop-up window that overlaps at least partially with the set item list, the set region comprising at least one setting for the selected set item; and if a setting in the set region is selected and entered, the controller may set a set value of the selected set item to the selected and entered setting.

The at least one other set item may be a set item which is to be manually set in association with the selected set item.

The at least one other set item may be a set item which is to be automatically set in association with the setting of the selected set item.

The at least one other set item may include a set item which is the same as the selected set item in at least one of an item type, an item name, a characteristic, a setting method, a setting effect and a setting target of the selected set item.

If an other set item in the menu is selected, the controller may control to display a pop-up window including a description of the other set item around the menu.

If an other set item in the menu is selected, the controller may control to change the set item list to a set item list for adjusting the selected other set item.

The set items may be associated with the at least one other set item during manufacturing of the display apparatus.

According to an aspect of another exemplary embodiment, there is provided a display apparatus. The display apparatus may include a display unit; and a controller which controls the display unit to display a high-ranking set item list comprising a plurality of super ordinate functions of the display apparatus, and a set item list for a highlighted super ordinate function, the set item list comprising a plurality of set items which are subordinate to the highlighted super ordinate function, and if a set item on the set item list is selected, to display a menu for accessing at least one other function, which is a super ordinate function or set item that has been pre-defined as being associated with the selected set item Additional aspects and advantages of the exemplary embodiments will be set forth in the detailed description, will be obvious from the detailed description, or may be learned by practicing the exemplary embodiments.

BRIEF DESCRIPTION OF THE DRAWING FIGURES

The above and/or other aspects will be more apparent by describing in detail exemplary embodiments, with reference to the accompanying drawings, in which:

FIG. 4 is a flowchart illustrating a method of setting a function according to an exemplary embodiment.

DETAILED DESCRIPTION

Figure 1:
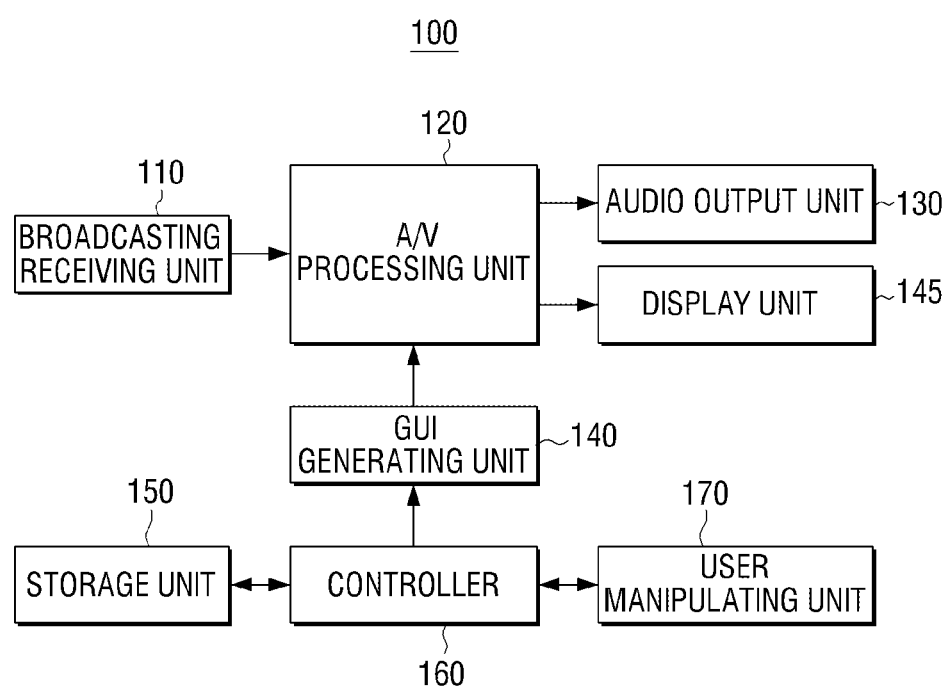
FIG. 1 is a block diagram illustrating a detailed configuration of a display apparatus according to an exemplary embodiment.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

FIG. 1 is a block diagram illustrating a display apparatus 100 according to an exemplary embodiment. The display apparatus may be embodied, for example, as a television (TV). As shown in FIG. 1, the display apparatus 100 includes a broadcasting receiving unit 110, an audio/video (A/V) processing unit 120, an audio output unit 130, a graphic user interface (GUI) generating unit 140, a display unit 145, a storage unit 150, a controller 160, and a user manipulating unit 170.

The broadcasting receiving unit 110 receives a broadcasting signal from a broadcasting station or a satellite by a cable or radio and demodulates the received broadcasting signal.

The A/V processing unit 120 performs signal-processing such as video decoding, video scaling, audio decoding, and the like for the video signal and the audio signal input from the broadcasting receiving unit 110. In addition, the A/V processing unit 120 outputs the video signal to the display unit 145 and the audio signal to the audio output unit 130.

On the other hand, in the case where the received video signal and the audio signal are stored in the storage unit 150, the A/V processing unit 120 stores the video signal and the audio signal in a compressed form in the storage unit 150.

The audio output unit 130 outputs the sound output from the A/V processing unit 120 to a speaker (not shown) or an audio output terminal connected to an external speaker.

The GUI generating unit 140 generates a GUI provided to a user. The GUI generated from the GUI generating unit 140 may be displayed in an on screen display (OSD) menu type on a screen.

More specifically, the GUI generating unit 140 may generate a configuration set screen 300 for setting a function of the display apparatus 100 as illustrated in FIGS. 3A to 3I. Description of the configuration set screen 300 will be described later with reference to FIGS. 3A to 3I.

The display unit 145 displays the video signal output from the A/V processing unit 120. In addition, the display unit 145 displays the image including the GUI generated from the GUI generating unit 140 in an OSD type. In particular, the display unit 145 may display the configuration set screen 300 generated from the GUI generating unit 140.

The storage unit 150 records multimedia contents received in the broadcasting receiving unit 110 to store the multimedia contents therein. In addition, in case in which the display apparatus is an Internet protocol television (IPTV), the storage unit 150 may store a multimedia contents file received from a network interface (not shown).

The storage unit 150 may store an other set item associated with a specific set item for setting a function of the display apparatus 100. Herein, the associated other set item is referred to as a set item for setting a function similar to the specific set item, or is referred to as a set item affecting the specific set item. For example, the associated other set item may be any one of a set item determined to be mutually set in association with the specific set item, a set item determined to be automatically set in association with the specific set item, and a set item which is the same as the specific set item in at least one of a type, a name, a characteristic, a setting method, a setting effect, and a setting target of the specific set item.

The storage unit 150 may include a hard disc, a non-volatile memory, and the like.

The user manipulating unit 170 inputs a command and transmits the command to the controller 160. More specifically, the user manipulating unit 170 receives a channel list setting command and a channel setting command. The user manipulating unit 170 may include buttons disposed on the display apparatus 100, a touch screen, a remote controller, or an input device, etc. The input device may be capable of four direction input such as a motion picture.

The controller 160 recognizes an input command based on content transmitted from the user manipulating unit 170 and controls overall operation of the display apparatus 100 according to the input command.

In particular, the controller controls the display unit 145 to display the configuration set screen 300 including an association function link menu.

Hereinafter, the configuration set screen 300 will be described in further detail with reference to FIG. 2.

Figure 2:
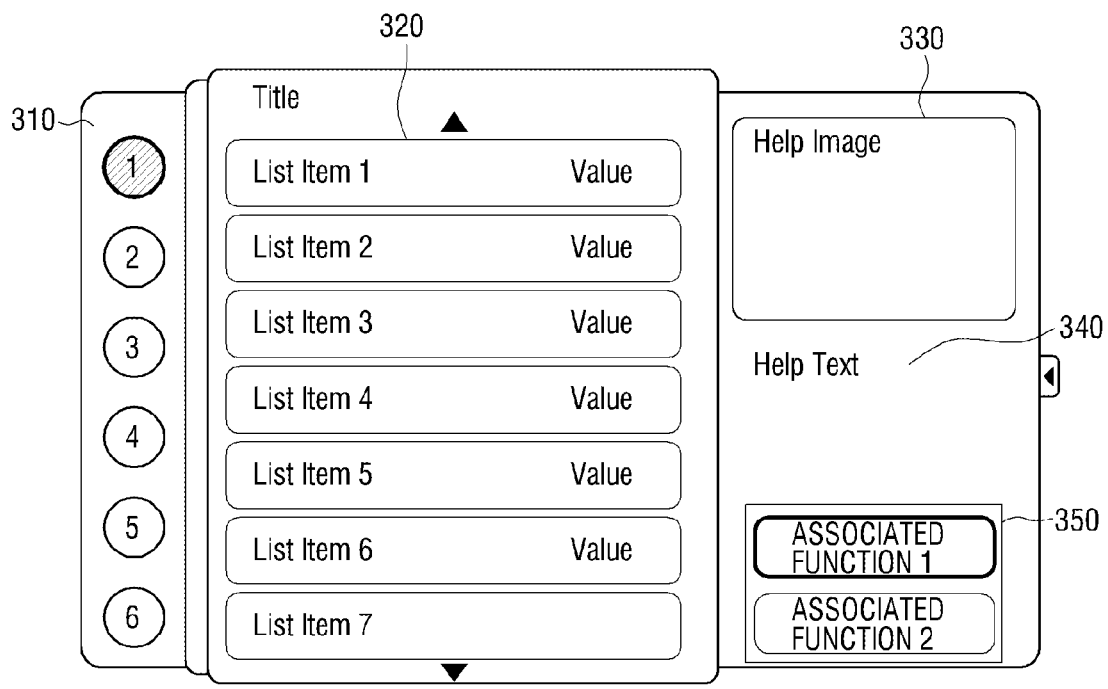
FIG. 2 is a view illustrating a configuration set screen including an association function link menu according to an exemplary embodiment.

FIG. 2 is a view illustrating a configuration set screen 300 including an association function link menu according to an exemplary embodiment. As illustrated in FIG. 2, the configuration set screen 300 includes a high-ranked set item 310, a set item list 320, a set item help image 330, a set item help text 340 and an associated function link menu 350.

The high-ranked set item 310 denotes a set item for functions of a super ordinate concept of the display apparatus 100. For example, ① may be a set item for setting a picture function of the display apparatus 100, ② may be a set item for setting a sound function of the display apparatus 100, and ③ may be a set item for setting a channel function of the display apparatus 100. ④ may be a set item for setting a three-dimensional (3D) function of the display apparatus 100, ⑤ may be a set item for setting an internet function of the display apparatus 100, and ⑥ may be a set item for setting a supplementary function of the display apparatus 100. In FIG. 2, the high-ranked set item 310 is displayed with ① highlighted.

The set item list 320 is a list including functions of subordinate concepts of the high-ranked set item 310 which is to be set. If the high-ranked set item 310 is a picture function (i.e., ①), the set item list 320 includes a set item corresponding to functions of subordinate concepts associated with the picture function of the display apparatus 100. Examples of the subordinate concepts associated with the picture function may be functions such as picture mode, contrast control, luminescence adjustment, edge control, and the like. The set item of the subordinate concept to be set is displayed with highlight.

In the set item help image 330, a help image for the set item of the subordinate concept to be set is displayed. The help image may be an image for a manipulation method used to set the set item of the subordinate concept, or may be a preview screen the set item of the subordinate concept (for example, contrast control of the picture function) is set.

In the set item help text 340, a help description for the set item of the subordinate concept to be set is displayed. The help description may be a description for a function of the display apparatus 100 corresponding to the set item of the subordinate concept for a manipulation method used when the set item of the subordinate concept is set. For example, assuming that the set item of the subordinate concept selected is the brightness control, the description for a brightness function control of the display apparatus 100 may be displayed in the set item help text 340.

The associated function link menu 350 performs a link function accessing at least one other set item associated with the selected set item, when the set item to be set is selected.

Herein, the associated other set item is referred to as a set item for setting a function similar to the selected set item, or as an other set item affected by the set value of the selected set item, when the selected set item is set. More specifically, the associated other set item may refer to a set item determined to be manually set in association with the selected set item, a set item determined to be automatically set in association with the selected set item, or a similar set item which is the same as the selected set item in at least one of an item type, an item name, a characteristic, a setting method, a setting effect or a setting effect, etc. of the selected set item.

For example, if the selected set item is a Picture mode which is set to a movie mode, the set item which is determined to be manually set in association with the selected set item may be a Sound mode. This is because it is advantageous to also change the Sound mode to a Movie mode for the display apparatus 100 to provide a complete movie mode when the Picture mode is set to the Movie mode. That is, the Sound mode which is determined to be manually set in association with the Picture mode may be the other set item associated with the Picture mode.

If the highlighted set item is an on/off mode of a power saving mode, the set item which is determined to be automatically set in association with the highlighted set item may be a brightness control. More specifically, if a power saving mode of the display apparatus 100 is set to an on mode, the brightness control is automatically set according to the on mode of the power saving mode. That is, the brightness control which is determined to be automatically set in association with the power saving mode may be the other set item associated with the power saving mode.

If the highlighted set item is SHARPNESS, a set item which performs a function similar to the highlighted set item may be EDGE ENHANCEMENT. More specifically, the SHARPNESS is a function which controls sharpness of an object edge and distinctly establishes an object boundary. That is, the EDGE ENHANCEMENT may be the other set item associated with the SHARPNESS.

If the highlighted set item is CONTRAST, a set item which performs a function similar to the highlighted set item may be DYNAMIC CONTRAST. That is, the DYNAMIC CONTRAST having a name similar to CONTRAST may be the other set item associated with the CONTRAST.

The above described associated other set items are only examples, and the exemplary embodiments are not limited thereto. Besides other than the above associated other set item, another set item which is controlled together with the specific set item to provide an improved watching experience may be included in the exemplary embodiment.

At this time, the other set item associated with the specific set item may be stored during manufacturing of the display apparatus 100 or may be set after the display apparatus is manufactured or by the user after purchasing the display apparatus.

Referring to FIG. 1 again, if the association function link menu 350 is selected, the controller 160 may control to display a description for the associated other set item around the associated function link menu 350. For example, if the associated other set item is a Sound mode, the controller 160 may control to display a description for the Sound mode around the associated function link menu 350. Here, "around" the associated function link menu 350 denotes that the description may be displayed as text in a selectable, separately differentiated area of the associated function link menu 350 (an example of which is shown in FIG. 2), or alternatively may be displayed as a pop-up window whose location is in the area of the associated function link menu 350.

If the association function link menu 350 is selected, the controller 160 may control to change the set item list 320 including the specific set item into a set item list 320 for adjusting the associated other set item corresponding to the association function link menu 350.

If entering one set item on the set item list 320, the controller 160 may control to display a set region 360 (see, e.g., FIGS. 3B and 3C) including settings for the selected set item in the display unit 145. In particular, if a setting for the set item is performed (i.e., selected and entered) on the displayed set region 360, the controller 160 may control to set the setting of set item as the set value of the set item. The controller 160 may control to display the set region 360 as a pop-up window that overlaps at least partially with the set item list 320, as shown, for example, in FIG. 3B or 3C.

The controller 160 may control to display a selected set item with highlight. If the highlight of the set item list 320 is moved, the controller 160 may control to change the previous associated function link menu 350 into an association function link menu 350 for at least other set item associated with the highlight-moved set item and display the changed associated function link menu 350.

As described above, the number of menu manipulations can be reduced and complicated functions of a system can be effectively changed by controlling one item and then setting the associated function.

Hereinafter, a method of setting a function of the display apparatus 100 by linking with an associated other set item via the associated function link menu 350 will be described with reference to FIGS. 3A to 3I.

Figure 3A:
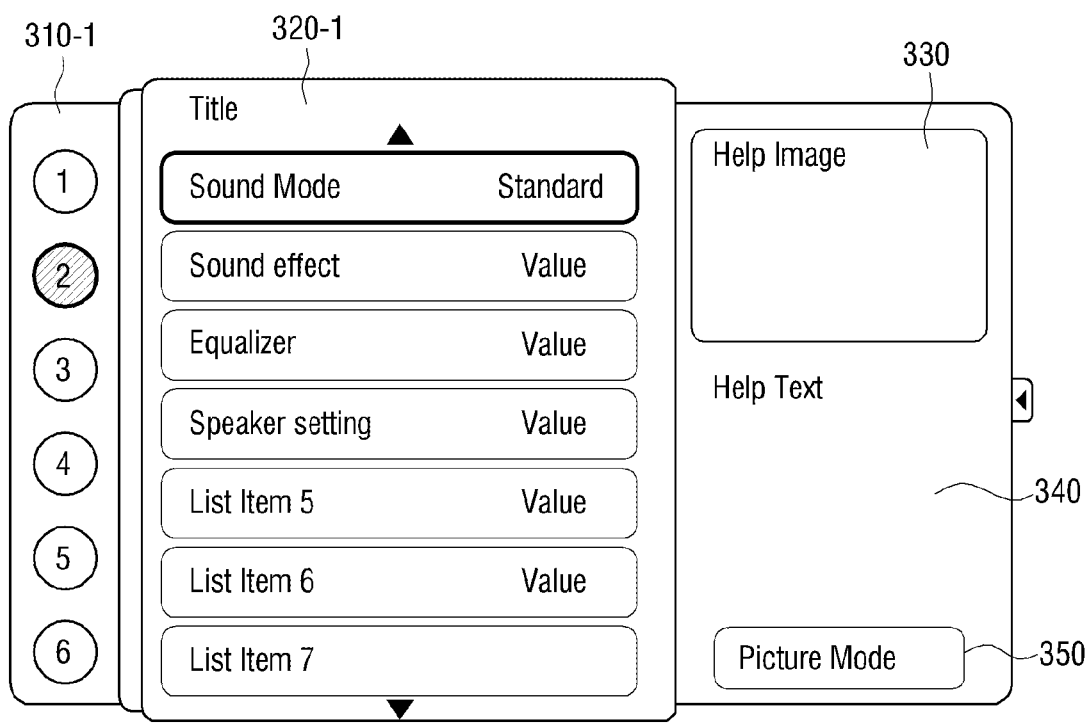
FIGS. 3A to 3I are views explaining a method of setting another set item associated with an associated function by providing an associated function link menu according to an exemplary embodiment.

FIG. 3A is a view illustrating a configuration set screen including the association function link menu 350 according to an exemplary embodiment. The selected set item is a Sound mode. Accordingly, the display apparatus 100 displays ② indicating a sound function which is a function of super ordinate concept of the Sound mode in a high-ranked set item 310-1 with highlight and displays the Sound mode in the set item list 320-1 with highlight.

Figure 3B:
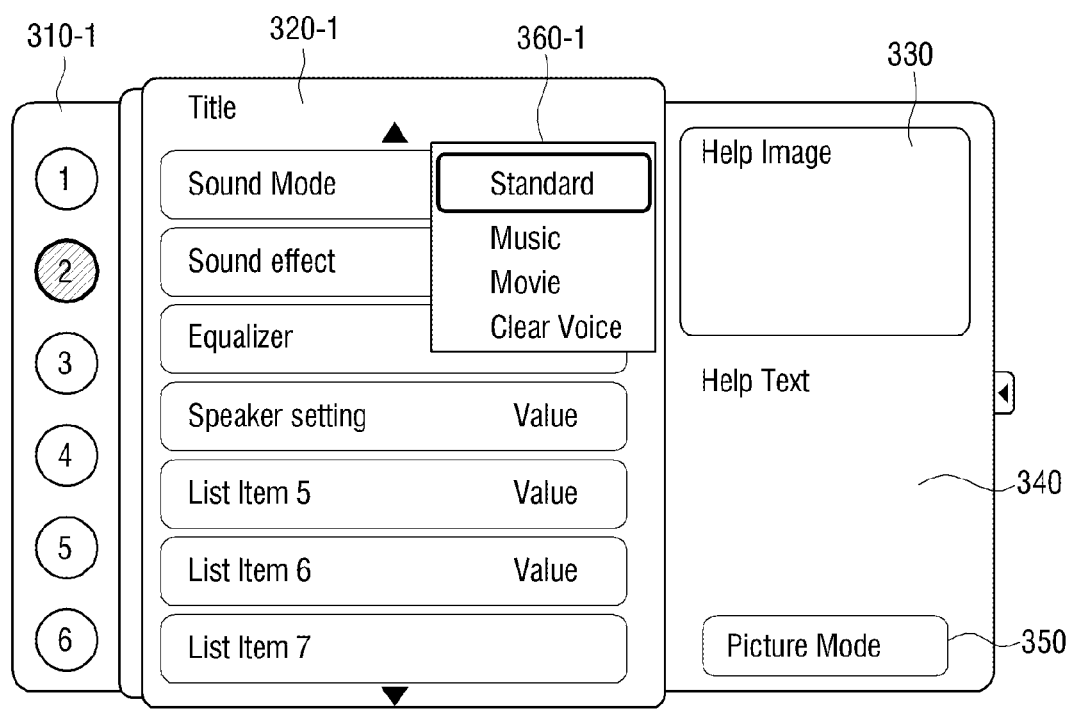

In order to set the Sound mode, if the [input] button of the remote controller is selected with the Sound mode highlighted to enter the set item, the display apparatus 100 displays a set region 360-1 showing settings for the Sound mode as illustrated in FIG. 3B. For example, the settings for the Sound mode may include a Standard mode, a Music mode, a Movie mode, a Clear mode, and the like. Assuming that the currently set sound mode is the Standard mode, the display apparatus 100 displays "Standard" in the set region 360-1 with highlight.

Figure 3C:
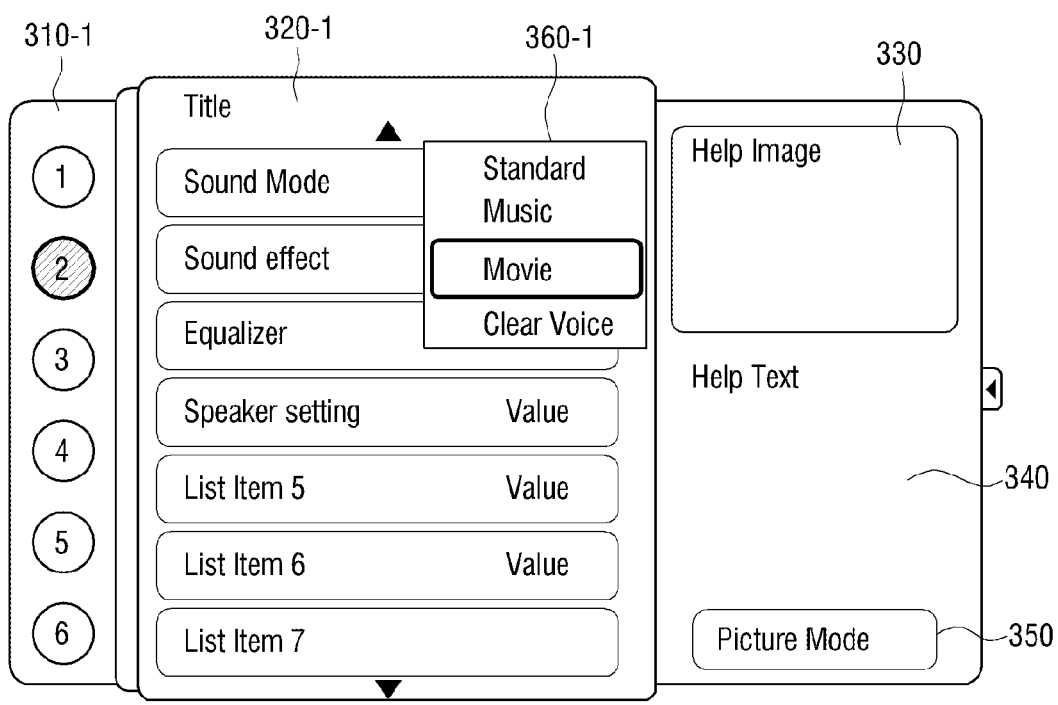
Figure 3D:
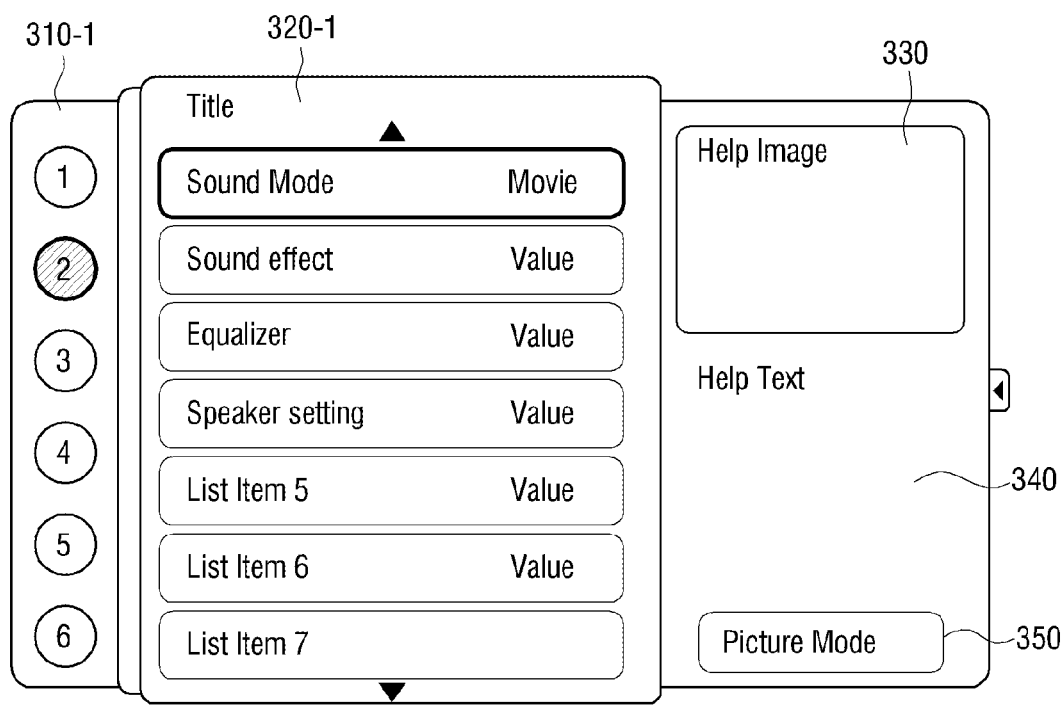
Figure 3E:
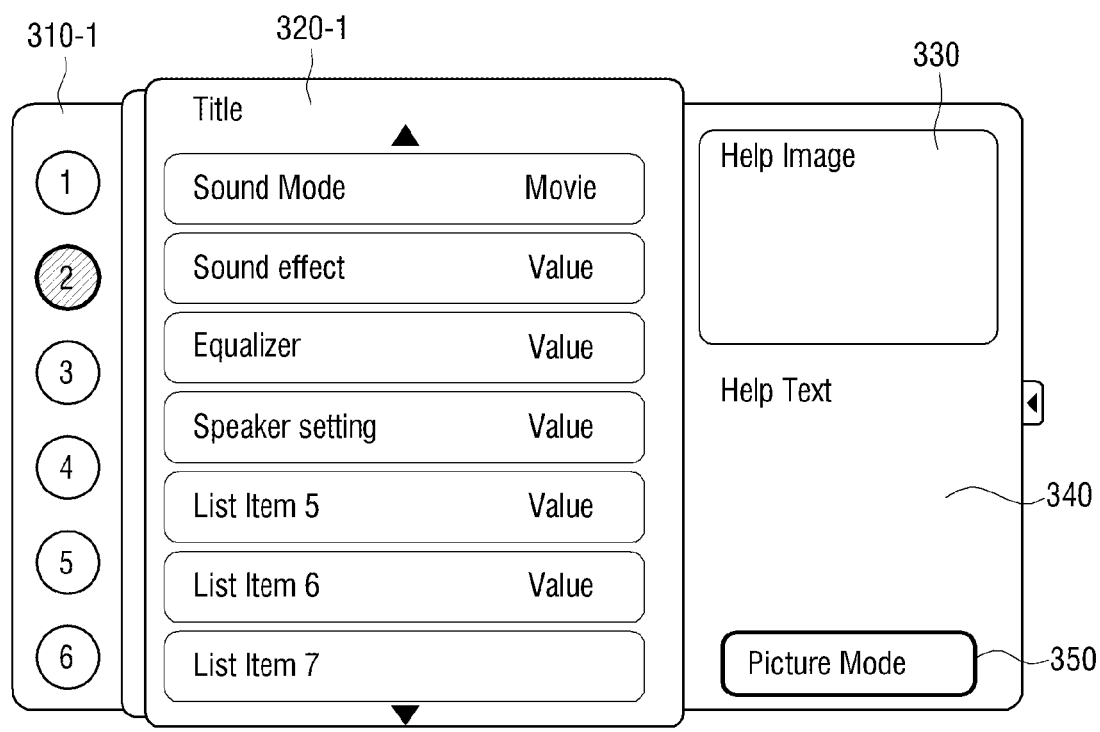

Assuming that a desired mode is the Movie mode, a button ▼ of the remote controller is selected twice, and the display apparatus 100 displays "Movie" in the set region 360-1 with highlight as illustrated in FIG. 3C. If the [input] button of the remote controller is selected while "Movie" is highlighted, the set value for the Sound mode is changed from Standard mode to the Movie mode, as illustrated in FIG. 3D.

The Picture mode may be selected following selecting the Sound mode. In such a case, a ▶ button of the remote controller is selected once, and the Picture mode which is displayed in the associated function link menu 350 is displayed with highlight as illustrated with FIG. 3E.

Figure 3F:
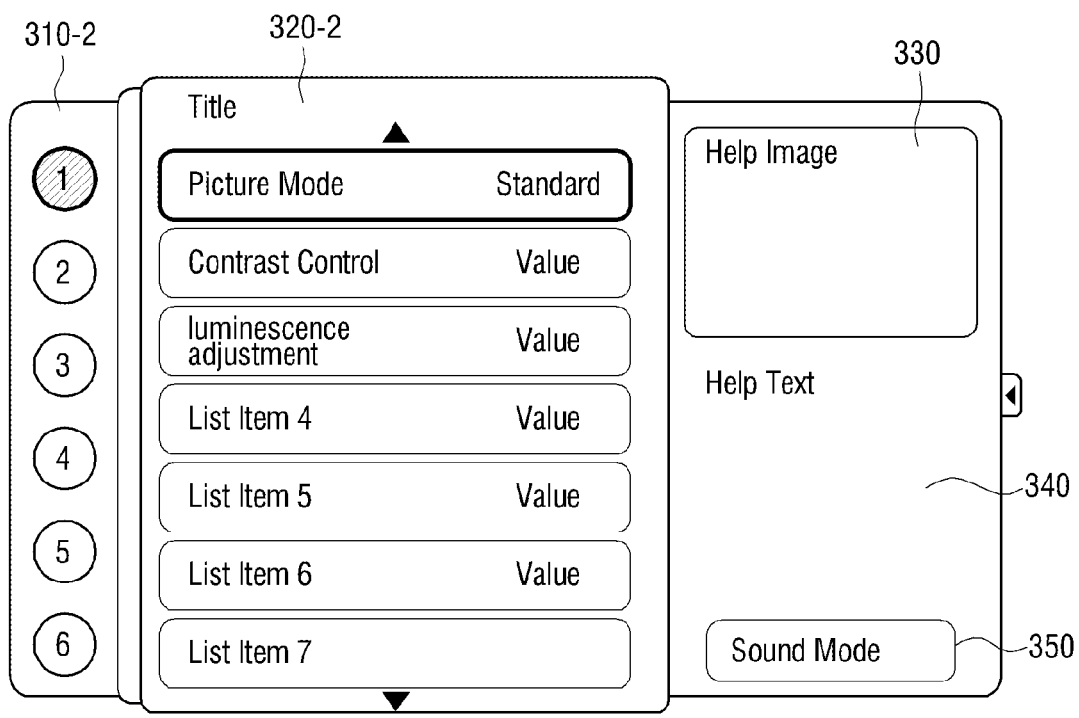

If the [input] button of the remote controller is selected while the Picture mode is highlighted in the associated function link menu 350, the display apparatus generates a set item list 320-2 for setting the Picture mode, as shown in FIG. 3F. More specifically, as illustrated in FIG. 3F, the display apparatus 100 displays ① indicating a picture function which is a function of super ordinate concept of the Picture mode in a high-ranked set item 310-2 with highlight and displays the Picture mode in the set item list 320-2 with highlight.

Figure 3G:
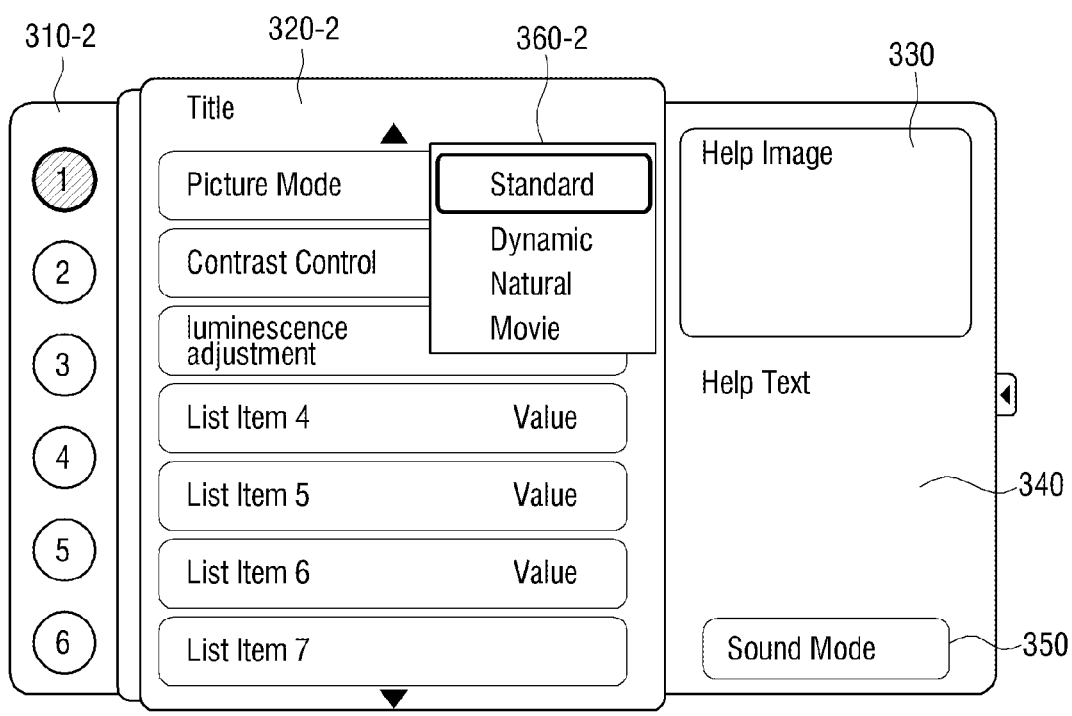

In order to set the Picture mode, the [input] button of the remote controller is selected to enter the set item, and the display apparatus 100 displays a set region 360-2 for the Picture mode as illustrated in FIG. 3G. The Picture mode may include a Standard mode, a Dynamic mode, a Natural mode, a Movie mode, and the like. As shown in FIG. 3G, the currently set Picture mode in this case is the Standard mode so that the display apparatus 100 displays "Standard" in the set region 360-2 with highlight.

Figure 3H:
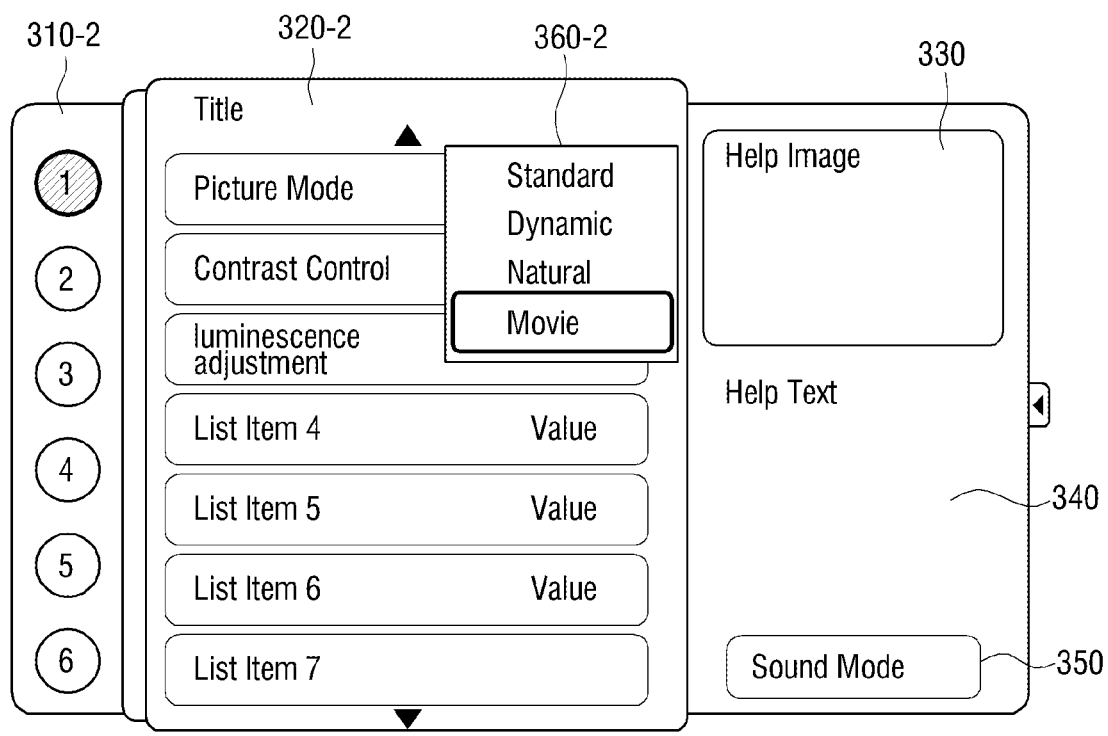
Figure 3I:
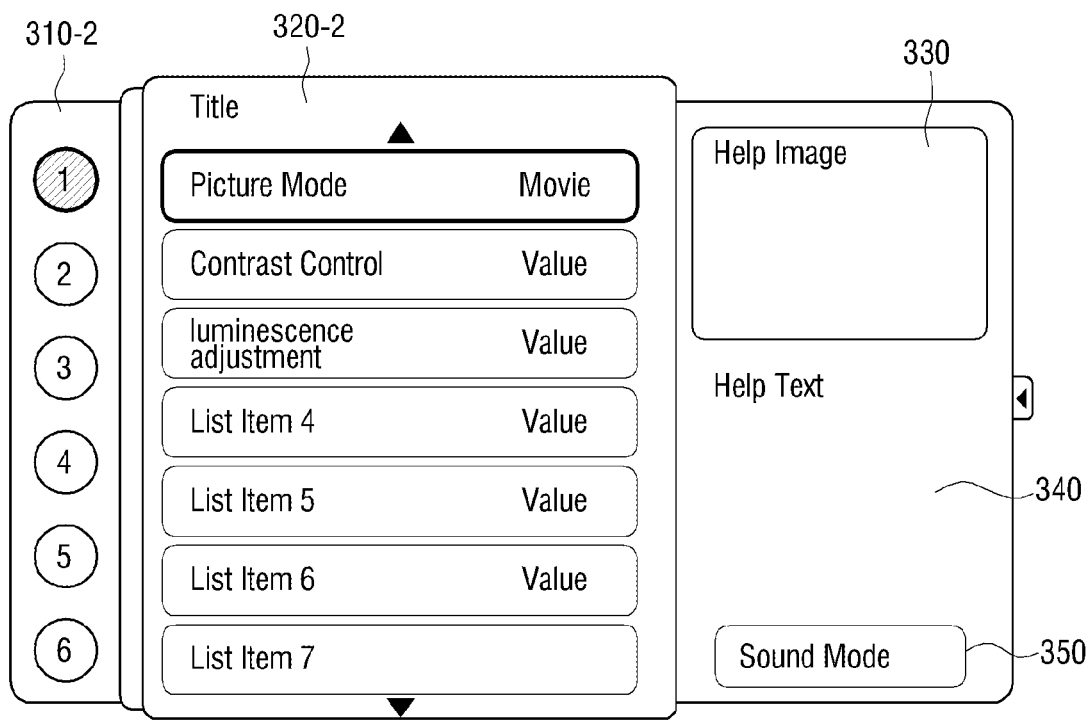

A ▼ button of the remote controller may then be selected three times, and the display apparatus 100 displays "Movie" in the set region 360-2 with highlight, as shown in FIG. 3H. Then, if the [input] button is selected while "Movie" is highlighted, the Picture mode changes from the Standard mode to the Movie mode as illustrated in FIG. 3I.

As described above, a remote controller is described as the input device for inputting commands to the user manipulating unit 170. However, this is only illustrated as an exemplary embodiment, and the inventive concept may be implemented using another input device such as a keyboard or mouse or the like. For example, the input device such as a touch screen may be used.

As described above, when the Sound mode is selected, the associated function link menu 350 for accessing the Picture mode, which is a function associated with the Sound mode, is provided together so that it is easier to set the Picture mode and the Sound mode to, for example, the Movie mode.

It is to be noted that in FIGS. 3A to 3I, only one associated function was described. However, more than one associated function may be provided for any given selected item. For example, FIG. 2 shows schematically two associated functions. However, more than two associated functions may also be provided, and the number of associated functions is not particularly limited Hereinafter, a method of setting a function via the associated function link menu 350 of the display apparatus 100 will be described in further detail with reference to FIG. 4.

FIG. 4 is a flowchart illustrating a method of setting a function of the display apparatus 100 according to an exemplary embodiment.

First, the display apparatus 100 displays a set item list 320 for setting a function of the display apparatus 100 (S401). The display apparatus determines whether a set item is selected from the displayed set item list 320 (S403).

If a set item of the displayed set item list 320 is selected (S403-Y), the display apparatus 100 provides the associated function link menu 350 for accessing at least one other set item associated with the selected set item (S405). The associated other set item is referred to as a set item for setting a function similar to the selected set item when the set item is set, or as a set item affected by the set value of the selected set item when the selected set item is set.

More specifically, the associated other set item is referred to as a set item that is to be manually set in association with the specific set item, as a set item that is to be automatically set when the selected specific item is set, or as a similar set item which is to be set the same as the selected specific item in at least one of a item type, an item name, a characteristic, a setting method, a setting effect, and a setting target, etc. of the selected specific set item.

The display apparatus 100 determines whether the selected set item of the set item list 320 is entered (S407). If the selected set item is entered (S407-Y), the display apparatus 100 displays a set region 360 for the entered set item in the display unit 145.

The display apparatus 100 determines whether a setting for the set item is performed in the set region 360 (S411). If the setting is performed via the set region 360 (S411-Y), the display apparatus 100 sets the set item to the set value that is selected in the set region 360 (S413).

As described above, if the set value for the selected set item is set, the display apparatus 100 determines whether the associated function link menu 350 for accessing an associated other set item is selected (S415). If the associated function link menu 350 is selected (S415-Y), the display apparatus 100 changes the displayed set item list into a set item list 320 for adjusting the other set item corresponding to the associated function in the associated function link menu (S417). The display apparatus 100 performs setting for the associated other set item (S419).

As described above, the number of menu manipulations can be reduced and complicated functions of a system can be effectively set by controlling one item and then setting the associated function.

As above, although the display apparatus 100 is explained as a television, this is only an exemplary embodiment, and the inventive concept may be applied to other display devices. For example, the display apparatus may be a projector, a monitor, a digital multimedia broadcasting (DMB) device, a portable multimedia player (PMP), etc.

According to the exemplary embodiments, the number of menu manipulations can be reduced and complicated functions of a system can be effectively set by controlling one item and then setting an associated function for the item.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of setting a function of a display apparatus, the method comprising:
   displaying a set item list including at least one set item on a first area of a screen of the display apparatus, wherein each of the at least one set item is an item for setting a function of the display apparatus;
   in response to selection of a first set item among the at least one set item included in the set item list displayed on the first area of the screen, displaying a menu for accessing at least one other set item associated with the selected first set item on a second area of the screen, the first area being separated from the second area and the menu including the at least one other set item, each of the at least one other set item being a set item which is automatically set for setting a function similar to a setting of the selected first set item;
   in response to entering of the selected first set item among the at least one set item included in the set item list displayed on the first area of the screen, displaying a set region for performing the setting of the selected first set item on the first area of the screen as a pop-up window overlapping at least partially with the set item list while displaying the menu for accessing the at least one other set item on the second area of the screen, the set region comprising at least one function setting for the selected first set item; and
   in response to selection of a second set item of the at least one other set item in the menu, automatically changing the set item list displayed on the first area of the screen to a set item list including at least one set item associated with the selected second set item of the at least one other set item in the menu and changing the at least one other set item in the menu to at least one set item which is automatically set for setting a function similar to a setting of the selected second set item,
   wherein each of the at least one other set item in the menu is a set item for setting a function of the display apparatus which is different from a function of the display apparatus set by the selected first set item among the at least one set item in the set item list displayed on the first area of the screen.

2. The method as claimed in claim 1, wherein the at least one other set item is a set item which is the same as the selected set item in at least one of an item type, an item name, a characteristic, a setting method, a setting effect and a setting target of the selected set item.

3. The method as claimed in claim 1, further comprising, in response to selection of another set item in the menu, displaying a pop-up window including a description of the other set item around the menu.

4. The method as claimed in claim 1, wherein the at least one set item is associated with the at least one other set item during manufacturing of the display apparatus.

5. The method as claimed in claim 1, further comprising:
   in response to selection and entering of a setting in the set region, setting a set value of the selected set item to the selected and entered setting.

6. The method as claimed in claim 1, wherein the method further comprising, in response to selection and entering of a setting in the set region, setting a set value of the selected set item to the selected and entered setting.

7. A display apparatus comprising:
   a display unit; and
   a controller which controls the display unit to display a set item list including at least one set item on a first area of a screen of the display apparatus, each of the least one set item being an item for setting a function of the display apparatus, and, in response to selection of a first set item among the at least one set item included in the set item list displayed on the first area of the screen, to display a menu for accessing at least one other set item associated with the selected first set item on a second area of the screen, the first area being separate from the second area and the menu including the at least one other set item, each of the at least one other set item being a set item which is automatically set for setting a function similar to a setting of the selected first set item,
   wherein in response to entering of the selected first set item among the at least one set item included in the set item list displayed on the first area of the screen, the controller controls the display unit to display a set region for performing the setting of the selected first set item on the first area of the screen as a pop-up window overlapping at least partially with the set item list while displaying the menu for accessing the at least one other set item on the second area of the screen, the set region comprising at least one function setting for the selected first set item,
   wherein in response to selection of a second set item of the at least one other set item in the menu, the controller controls the display unit to automatically change the set item list displayed on the first area of the screen to a set item list including at least one set item associated with the selected second set item of the at least one other set item in the menu and change the at least one other set item in the menu to at least one set item which is automatically set for setting a function similar to a setting of the selected second set item, and
   wherein each of the at least one other set item is a set item for setting a function of the display apparatus which is different from a function of the display apparatus set by the selected first set item among the at least one set item in the set item list displayed on the first area of the screen.

8. The display apparatus as claimed in claim 7, wherein the at least one other set item is a set item which is the same as the selected set item in at least one of an item type, an item name, a characteristic, a setting method, a setting effect and a setting target of the selected set item.

9. The display apparatus as claimed in claim 7, wherein in response to selection of another set item in the menu, the controller controls to display a pop-up window including a description of the other set item around the menu.

10. The device apparatus as claimed in claim 7, wherein the at least one set item is associated with the at least one other set item during manufacturing of the display apparatus.

11. The display apparatus as claimed in claim 7, wherein in response to selection and entering of a setting in the set region, the controller sets a set value of the selected set item to the selected and entered setting.

12. The display apparatus as claimed in claim 7, wherein in response to selection and entering of a setting in the set region, the controller sets a set value of the selected set item to the selected and entered setting.

13. A display apparatus comprising:
a display unit; and
a controller which controls the display unit to display a high-ranking set item list comprising a plurality of super ordinate functions of the display apparatus, and a set item list for a highlighted super ordinate function on a first area of a screen of the display apparatus, the set item list comprising a plurality of set items which are subordinate to the highlighted super ordinate function, wherein each of the plurality of set items is an item for setting a function of the display apparatus, and
in response to selection of a first set item among the plurality of set items included in the set item list displayed on the first area of the screen, to display, on a second area of the screen, a menu for accessing at least one other function, which is a super ordinate function or set item that has been pre-defined as being associated with the selected set item, the first area being separated from the second area, and the menu including at least one other item corresponding to the least one other function, each of the at least one other items being a set item which is automatically set for setting a function similar to a setting of the selected first set item,
wherein in response to entering of the selected first set item among the plurality of set items included in the set item list displayed on the first area of the screen, the controller controls the display unit to display a set region for performing the setting of the selected first set item on the first area of the screen as a pop-up window overlapping at least partially with the set item list while displaying the menu for accessing the at least one other function on the second area of the screen, the set region comprising at least one function setting for the selected first set item,
wherein in response to selection of a second item of the at least one other item in the menu, the controller controls the display unit to automatically change the set item list displayed on the first area of the screen to a set item list including a plurality of set items associated with the selected second item of the least one other item in the menu and change the at least one other set item in the menu to at least one set item which is automatically set for setting a function similar to a setting of the selected second set item, and
wherein each of the at least one other set item in the menu is a set item for setting a function of the display apparatus which is different from a function of the display apparatus set by the selected first set item among the plurality of set items in the set item list displayed on the first area of the screen.

14. The display apparatus as claimed in claim 13, wherein the at least one other function is pre-defined as being associated with the at least one set item during manufacturing of the display apparatus.

\* \* \* \* \*